Feb. 5, 1963 V. F. ARPAJIAN 3,076,229
TRANSFER APPARATUS FOR MOLDING PRESS HAVING PREHEATER
Filed June 2, 1959 2 Sheets-Sheet 1

Vasken F. Arpajian
INVENTOR.

BY Adams, Forward & McLean

ATTORNEYS

United States Patent Office 3,076,229
Patented Feb. 5, 1963

3,076,229
TRANSFER APPARATUS FOR MOLDING
PRESS HAVING PREHEATER
Vasken F. Arpajian, Philadelphia, Pa., assignor to F. J.
Stokes Corporation, Philadelphia, Pa., a corporation of
Pennsylvania
Filed June 2, 1959, Ser. No. 817,635
2 Claims. (Cl. 18—30)

This invention relates to molding press apparatus. More particularly, it relates to the improved transfer of particulate molding material from a preheater therefor to the molding press by way of a reciprocating molding press feed board.

Preheating of resinous molding materials and the like prior to the introduction thereof into a mold cavity has several well-known advantages. For example, preheating reduces the moisture content of the material, thereby improving the electrical properties of the finished product. Also, when thermosetting materials are preheated, curing is started prior to introduction of the material into the mold cavity, thus reducing the time required for curing within the mold cavity.

An important factor upon which the time and pressure required for proper polymerization depend is the amount of heat required to be transferred from the mold. When the initial temperature gradient between the material and the mold cavity is reduced by preheating the material, the time of the molding cycle of the press can be shortened. A reduction in the amount of heat required to be added to the material within the mold cavity resulting from a reduced initial temperature gradient between the material and the mold cavity also permits a reduction in the pressure required to effect polymerization.

In addition, preheating of molding material drives off some of the volatile resins within the material which, if present, would prolong the curing time by increasing the gas pressure within the mold cavity. A reduction of the gas pressure also improves the finish of the molded article by eliminating surface flow marks.

However, the foregoing advantages of preheating molding material can be obtained to their fullest extent, and some disadvantages of preheating eliminated, only when the material is preheated uniformly to the proper temperature and such uniform temperature is substantially maintained in the material as it passes from the preheater into the mold cavity. For example, a temperature gradient within the charge of material when introduced into the mold cavity reduces or may eliminate the advantages of preheating and often results in a product inferior to that obtainable without preheating. Some of the disadvantages of improper preheating are caking of the molding materials, impairment of its flowing properties, and the like.

Preheating of the molding material has been employed advantageously in the operation of the molding press of U.S. Patent No. 2,582,891 to Strauss in conjunction with the continuous preheater described in co-pending application Serial No. 708,911 to McMinn et al., now U.S. Patent Number 2,889,441. The mold cavities of the molding press are charged with preheated material from the bottoms of the pockets, i.e., feed tubes, of the press reciprocating feed board when the feed board is fully advanced into the press and the feed board pockets are re-filled with preheated material from the bottom of the preheater through an opening in the lower end of the preheater's heating chamber when the feed board is fully withdrawn out of the press and is positioned beneath the preheater heating chamber.

However, the operation of the molding press of the Strauss patent, together with the preheater of the McMinn et al. application has proven disadvantageous in certain respects and, primarily, because, while the preheater can agitate, heat and discharge molding material from the opening in the lower end of the heating chamber continuously, the molding press feed board which reciprocates into and out of the molding press cyclically, as determined by the length of the curing cycle of the press, can advantageously be re-filled by the preheater only intermittently. Thus, if any of the preheated material is permitted to drop into the feed tubes of the feed board as it returns out of the mold press and such material then stays in the feed board away from the heating lamp and the agitation available in the preheater of U.S. Patent Number 2,889,441 to McMinn et al. during the curing cycle of the press of U.S. Patent No. 2,582,891 to Strauss, such material cools or cakes up, depending on the length of the cure time. Then, whether such material alone is sought to be transferred to the mold cavity or such material plus material freshly taken from the preheater is sought to be transferred to the mold cavity, the charge going to the mold cavity will not be the properly preheated one.

Accordingly, it is an object of the present invention to provide improved means for transferring particulate molding material from a preheater therefor to a mold cavity. Another object is to provide improved means to maintain substantially the temperature of molding material passing from a preheater to a mold cavity by way of a mold press feed board. Another object is to provide improved means to prevent untimely transfer of preheated molding material from the preheater to a mold press feed board. Another object is to provide improved means to reduce the cooling and/or caking of preheated molding material in the feed board of a mold press. These and other objects are accomplished by the auxiliary molding material preheater shut-off of the present invention. The improvement of the present invention includes, in combination with a molding press having molding cavities for the reception of molding material, a molding material preheater having a heating chamber and an opening in the bottom of the heating chamber for the discharge of the molding material, and a horizontally reciprocating molding press feed board having feed pockets for the reception at their upper ends of the molding material from the opening in the bottom of the heating chamber when the feed board is withdrawn from the molding press and for the discharge at their lower ends of the molding material into the molding cavities when the feed board is advanced into the molding press, a flat plate having one solid end normally positioned between the opening in the bottom of the heating chamber and the upper surface of the molding press feed board, an aperture in the other end of the flat plate, and actuating means for reciprocating the flat plate and positioning the aperture in the other end of the flat plate between the opening in the bottom of the heating chamber and the upper surface of the molding press feed board whereby the opening in the bottom of the heating chamber is opened when the feed board is withdrawn from the molding press. The aperture is, preferably, rectangular in shape and has its longer centerline along the slide path of the plate.

For a better understanding of the present invention, reference should be had to the attached drawings in which.

Figure 1:
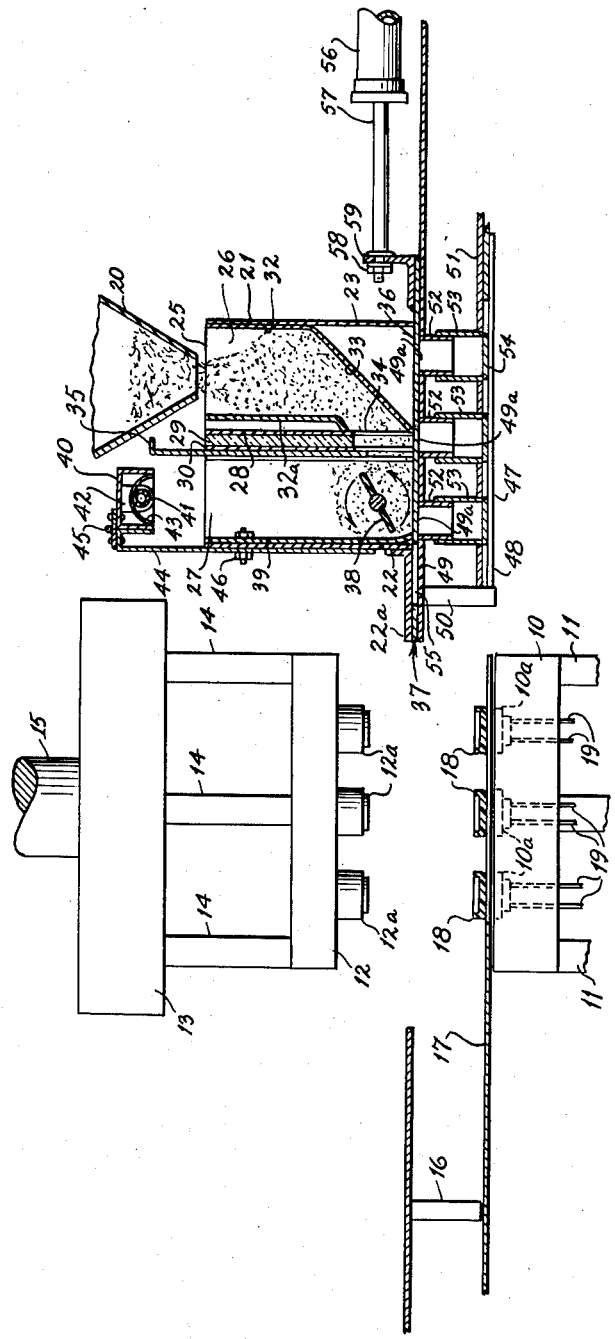
FIGURE 1 is a side view, partly in section, of the auxiliary preheater shut-off of the present invention in conjunction with a molding press, molding press feed board and particulate molding material preheater, showing the shut-off in the closed position and the feed board in the retracted position.

As shown in FIGURE 1, heated die plate 10 having three die cavities 10a is supported upon a fixed lower platen (not shown) of a molding press by suitable spacer blocks 11. Similarly, heated force plate 12 having three forces 12a is supported on the lower face of movable platen 13 by suitable spacer blocks 14. Platen 13 is connected on its upper face to press piston rod or ram 15. These elements of a molding press are substantially as described in U.S. Patent No. 2,582,891 to Strauss.

FIGURE 1 also shows a molding press stripper comb assembly 16 in simplified form and arranged for bottom ejection of the molded products. A comb plate 17 in extended position holds molded products 18 which have been lifted from die cavities 10a with the aid of ejection pins 19 preparatory to the removal (to the left side) of such products from the molding press and the initiation of a new molding cycle.

At the opposite side of the molding press from stripper comb assembly 16, FIGURE 1 shows a cross-section a conical hopper 20 for particulate molding material and a preheater 21 therefor. Preheater 21 is substantially as described in U.S. Patent Number 2,889,441 to McMinn et al. and is a box-like structure which is preferably of sheet metal and of generally rectangular horizontal cross-section. It has a front wall 22 and a rear wall 23 and opposing side walls, only one of which 25 is shown. Preheater 21 is divided into a metering chamber 26 and a heating chamber 27 by a vertically-disposed insulating panel 28 comprising a sheet of thermal insulating material 29 disposed between sheet metal plates 30 and 31. Metering chamber 26 of preheater 21 is provided with a flow director 32 extending between the side walls of the unit and having a lower portion 33 disposed at an angle of approximately 40° from the horizontal and intersecting the dividing panel 28 along its lower edge. Particulate molding material flows by gravity from hopper 20 into the open top of metering chamber 26 and is directed toward dividing panel 28 by sloping portion 33 of flow director 32 and confining plate 32a. A horizontally spaced rectangular opening 34 is formed in the lowermost portion of dividing panel 28 to permit flow of the material from metering chamber 26 into heating chamber 27. Flow of the material from metering chamber 26 into heating chamber 27 is regulated or controlled by a vertically slidable shut-off, i.e., gate 35, which blocks the flow of molding material through opening 34 when moved to its lowermost position and which permits a controlled or metered flow of the material therethrough when elevated adjustable amounts.

Further, as shown in FIGURE 1, the molding material, upon entry into heating chamber 27, rests on the upper surface of one end 36 of slide plate 37. The material is agitated and dispersed within heating chamber 27 by a paddle-like agitating means 38 which, in so doing, transfers the molding material from its entry position into a discharge position. The drive means for paddle 38 are not shown. To further insure uniform heating of the molding material, heating chamber 27 is provided with a baffle plate 39 which extends between the side walls of the preheater inwardly of front wall 22. The baffle plate 39 has an upper vertically disposed planular portion substantially parallel to and closely spaced from a plane tangent to the outermost arc of rotation of the paddle 38 and a lower arcuate portion concentric with and having a slightly larger radius than the maximum radius of paddle 38. A box-like lamp enclosure 40 having a lower open side facing heating chamber 27 is mounted above the chamber. A suitable heat lamp 41, such as a tubular infra-red lamp, is mounted in a pair of conventional receptacles 42 attached to the interior of lamp enclosure 40. Lamp 41 radiates infra-red energy into heating chamber 27, a reflector 43 being interposed between lamp 41 and enclosure 40. Lamp enclosure 40 is attached to an L-shaped bracket 44, preferably by suitable hinges 45 that allow enclosure 40 to be swung upwardly and away from the open top of heating chamber 27 to provide for easy access into the heating chamber and to facilitate lamp replacement. The L-shaped bracket 44 can be mounted to the exterior of front wall 22 of preheater 21 by bolt 46 received in such wall and passing through suitable slots in bracket 44 to provide for vertical adjustment of the lamp-to-agitator distance.

Below preheater 21, FIGURE 1 shows a simplified molding press feed board 47 supported upon a sliding carriage formed of a pair of parallel rods 48, only one of which is shown, and having upper horizontal plate 49 and cross-head 50. Molding press feed board 47 is substantially as described in U.S. Patent No. 2,582,891 to Strauss. The forward end of plate 49 is provided with a plurality (three are shown) of apertures 49a equal in number to the number of die cavities 10a provided in die plate 10 and being arranged to have vertical alignment with die cavities 10a when the board is in its forward position. The feed board 47 also includes a lower perforated plate 51 having perforations in alignment with perforations 49a in plate 49. Each aperture in the feed board is provided with a measuring pocket, i.e., cavity, formed of an upper tube 52 supported in the aperture of plate 49 and a lower tube 53 telescoping with the tube 52 and supported in the aperture of plate 51. The amount of telescoping of the tube and, therefore, the volume of the measuring cavities can be adjusted. Further, the feed board includes a stop plate 54 slidably mounted immediately below the lower tube plate 51 and provided with apertures which register with the lower ends of the tubes 53 when the stop plate is in the discharging position, but normally the plate 54 is positioned so that solid portions thereof close the lower ends of the tubes 53.

As already noted, FIGURE 1 shows one end 36 of slide plate 37 as a resting place for the molding material entering heating chamber 27 from metering chamber 26 through opening 34. This solid end 36 of slide plate 37, is positioned between the lower end of heating chamber 27 and the upper surface of mold press feed board 47, i.e., the upper surface of upper horizontal plate 49, and it closes the open bottom of heating chamber 27, so as to enable the agitation of the molding material by paddle 38 and the preheating of such material by heat lamp 41 without discharge of such material into apertures 49a of plate 49 or feed tubes 52 and 53. Also shown in FIGURE 1 is aperture 55 in the other end of slide plate 37 which is positioned between the horizontal portion of shoe 22a which is an angle iron the vertical portion of which is abuttingly affixed to wall 22 of preheater metering chamber 26, and the upper surface of mold press feed board 47. Shoe 22a covers aperture 55 whenever it does not serve to provide an opening in the lower end of heating chamber 27.

FIGURES 1 to 5 show the operation of slide plate 37. Actuated by, for example, air cylinder 56 and threaded rod 57 which are connected to slide plate 37 by nut 58 and flange 59, slide plate 37 moves substantially constantly from right to left and back, depending on the timing of the curing cycle of the molding press.

Figure 2:
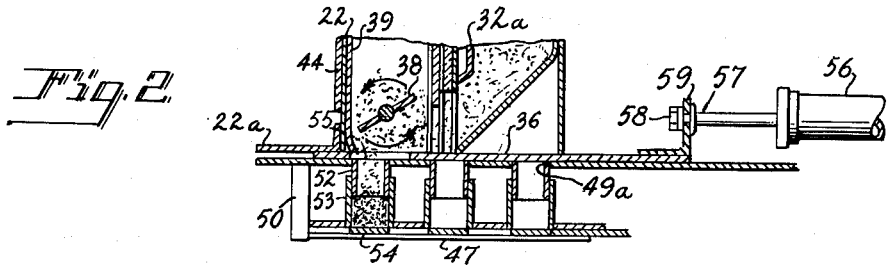
FIGURE 2 is a side view, in section, of the auxiliary preheater shut-off of FIGURE 1, showing the shut-off in the open position and the feed board in the retracted position.
Figure 3:
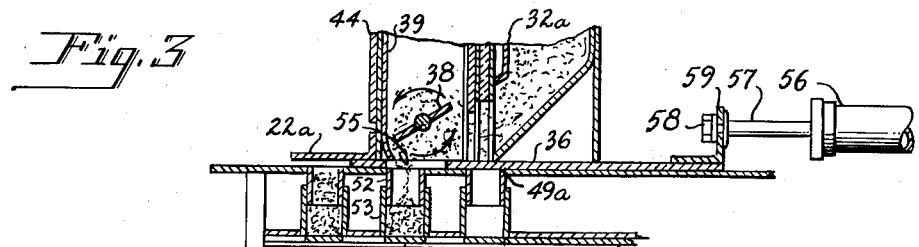
FIGURE 3 is a side view, in section, of the auxiliary preheater shut-off of FIGURE 1, showing the shut-off in the open position and the feed board in a first partially extended position.
Figure 4:
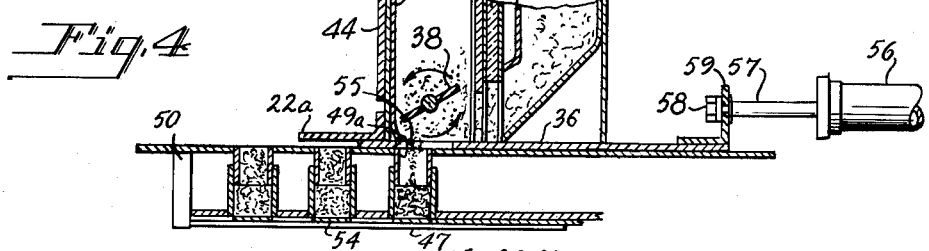
FIGURE 4 is a side view, in section, of the auxiliary preheater shut-off of FIGURE 1, showing the shut-off in the open position and the feed board in a second partially extended position; and, FIGURE 5 is a side view, in section, of the auxiliary preheater shut-off of FIGURE 1, showing the shut-off in the closed position and the feed board in a third partially extended position.
Figure 5:
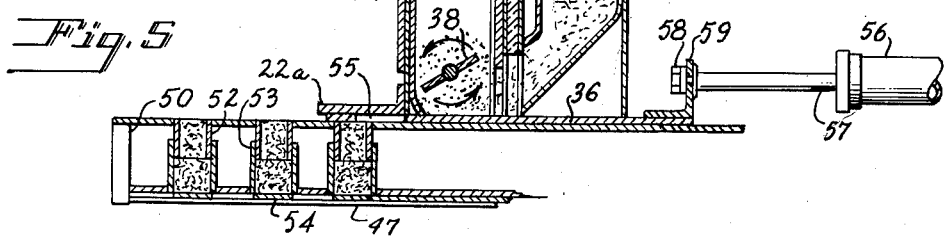

Thus, the first step of the sequence involves the opening of the molding press; the operation of the ejection pins 19 and comb plate 17 of comb assembly 16 to remove molded parts 18 from die cavities 10a; and, the agitating by paddle 38 and heating by heat lamp 41 of molding material in heating chamber 27 of preheater 21, while slide plate end 36 closes the lower end of heating chamber 27 and molding press feed board 47 is retracted from the molding press and positioned beneath slide plate end 36. This is shown in FIGURE 1. Then, molding press feed board 47 begins its continuous, uninterrupted movement into the molding press and just before or just as molding press feed board 47 begins its uninterrupted return, i.e., movement to the left in the attached drawings, into the press, slide plate 37 is advanced, i.e., moved to the right in the attached drawings, by means of air cylinder 56 and rod 57 and aperture 55 is positioned across and to open the lower end of heating chamber 27, permitting the discharge of preheated particulate molding material into the first of apertures 49a and feed tubes 52 and 53. The latter is closed on its lower end by stop plate 54. This is shown in FIGURE 2. Then, mold press feed board 47 is partially extended, i.e., uninterruptedly continues to advance to the left in the attached drawings, and into the mold press, so as to enable the discharge of preheated molding material into the second of apertures 49a and feed tubes 52 and 53. The latter is closed on its lower end by stop plate 54. This is shown in FIGURE 3. Then, molding press feed board 47 uninterruptedly continues to advance to a second partially extended position, so as to enable the discharge of preheated comminuted moldable material into the third of apertures 49a and feed tubes 52 and 53. The latter is closed on its lower end by stop plate 54. This is shown in FIGURE 4. Next, slide plate 37 is retracted, i.e., moved to the left in the attached drawings, by means of hydraulic cylinder 56 and rod 57 and its solid end portion 36 again closes the lower end of heating chamber 27, while molding press feed board 47 continues to advance to a third partially extended position. This is shown in FIGURE 5. Thereafter, molding press feed board 47 will be advanced to a fully extended position in the molding press, so as to enable the charging of the die cavities 10a by feed tubes 52 and 53 from the lower ends of which stop plate 54 has been retracted, and returned to permit the closing of the molding press for the cure cycle. Since the slide plate 37 selectively controls flow from the discharge opening of the heating chamber 27, the slide plate 37 may be referred to hereinafter as a valve means.

While the present invention has been described with reference to a feed transfer arrangement having individual feed pockets for measuring mold press charges which are mounted in a reciprocating feed board moving from a position beneath the preheater to a position above the die cavities to which the charges are delivered, it will be apparent that the invention is also applicable to feed arrangements in which the feed tubes are measuring cylinders permanently mounted beneath the preheater and in communication with ducts or shutes or the like for directing discharge of the measured charge from the measuring cylinders into the proper die cavity upon opening of a closure member positioned between the measuring cylinder and the ducts or shutes. Such feeding devices are known in the art for feeding compression molding presses from conventional molding material hoppers and they sometimes include means, e.g., cams, for producing oscillatory or receiprocating movement of the discharge ends of the ducts or shutes.

What is claimed is:

1. Apparatus comprising a moulding press feed board, said feed board having a plurality of pockets for retaining moulding material, a preheater means for heating moulding material, said preheater means being mounted above said feed board and having a discharge opening for discharging moulding material into said pockets, means structurally interrelated with said feed board for cyclically reciprocating said feed board between a loading position beneath said preheater means and an unloading position, a valve means selectively controlling flow through said opening, and means for cyclically operating said valve means in timed relation with respect to reciprocation of said feed board so that said valve means enables discharge through said opening only when said feed board is moving toward its unloading position.

2. Apparatus comprising a moulding press feed board adapted to convey moulding material to a moulding cavity of a moulding press, means for reciprocating said feed board between a loading position and an unloading position, said feed board having a plurality of feed pockets, a preheater means for heating moulding material, said preheater means being mounted above said feed board and having a discharge opening for discharging moulding material into said pockets, a reciprocably mounted plate between said discharge opening and said feed board, said plate having an aperture therethrough, means for reciprocating said plate in timed relation with respect to the reciprocation of said feed board so that said plate aperture is in line with said discharge opening only when said feed board is moving toward its unloading position, and said feed board being mounted so that each pocket passes successively beneath said opening when said feed board is moving toward said unloading position.

References Cited in the file of this patent
UNITED STATES PATENTS

| | | |
|---|---|---|
| 767,872 | Davies | Aug. 16, 1904 |
| 2,394,260 | Pfeilsticker | Feb. 5, 1946 |
| 2,409,725 | Whitmore et al. | Oct. 22, 1946 |
| 2,582,891 | Strauss | Jan. 15, 1952 |
| 2,789,336 | Shealy | Apr. 23, 1957 |
| 2,852,809 | Miles et al. | Sept. 23, 1958 |
| 2,889,441 | McMinn et al. | June 2, 1959 |